(12) United States Patent
Sanderson

(10) Patent No.: US 6,292,468 B1
(45) Date of Patent: Sep. 18, 2001

(54) METHOD FOR QUALIFYING A LOOP FOR DSL SERVICE

(75) Inventor: David M. Sanderson, Plymouth, MN (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/435,954

(22) Filed: Nov. 9, 1999

Related U.S. Application Data

(60) Provisional application No. 60/114,426, filed on Dec. 31, 1998.

(51) Int. Cl.[7] ............................ H04J 3/14; H04M 1/24
(52) U.S. Cl. ................................... 370/241; 379/27
(58) Field of Search ..................... 370/241, 249, 370/252; 379/21, 27, 29, 30, 31

(56) References Cited

U.S. PATENT DOCUMENTS

| | | |
|---|---|---|
| 4,791,659 | 12/1988 | Ross . |
| 5,166,925 | 11/1992 | Ward . |
| 5,559,854 | 9/1996 | Suzuki . |
| 5,784,558 | 7/1998 | Emerson et al. . |
| 5,793,751 * | 8/1998 | Baker et al. ........................ 370/250 |
| 5,883,883 * | 3/1999 | Baker et al. ........................ 370/250 |
| 5,892,756 * | 4/1999 | Murphy .............................. 370/241 |
| 5,909,445 * | 6/1999 | Schneider ........................... 370/468 |
| 5,991,270 * | 11/1999 | Zwan et al. ........................ 370/249 |
| 6,002,671 | 12/1999 | Kahkoska et al. . |
| 6,014,425 * | 1/2000 | Bingel et al. ....................... 379/27 |
| 6,058,162 * | 5/2000 | Nelson et al. ...................... 379/27 |
| 6,091,713 * | 7/2000 | Lechleider et al. ................. 370/248 |

\* cited by examiner

Primary Examiner—Min Jung
(74) Attorney, Agent, or Firm—Brooks & Kushman P.C.

(57) ABSTRACT

A method for qualifying a local loop for digital subscriber line service utilizes a test device connected to the customer end of the loop to measure test signals originating from the provider end of the loop. An output for the loop qualification test device is based on the measured test signal.

19 Claims, 2 Drawing Sheets

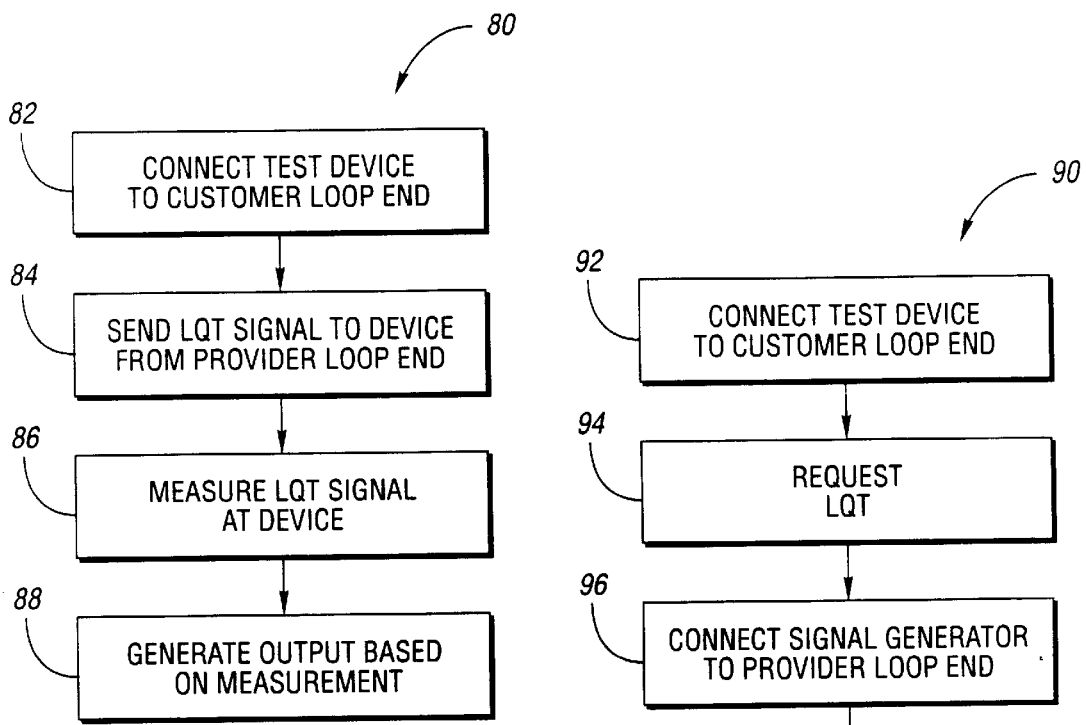
Fig. 3
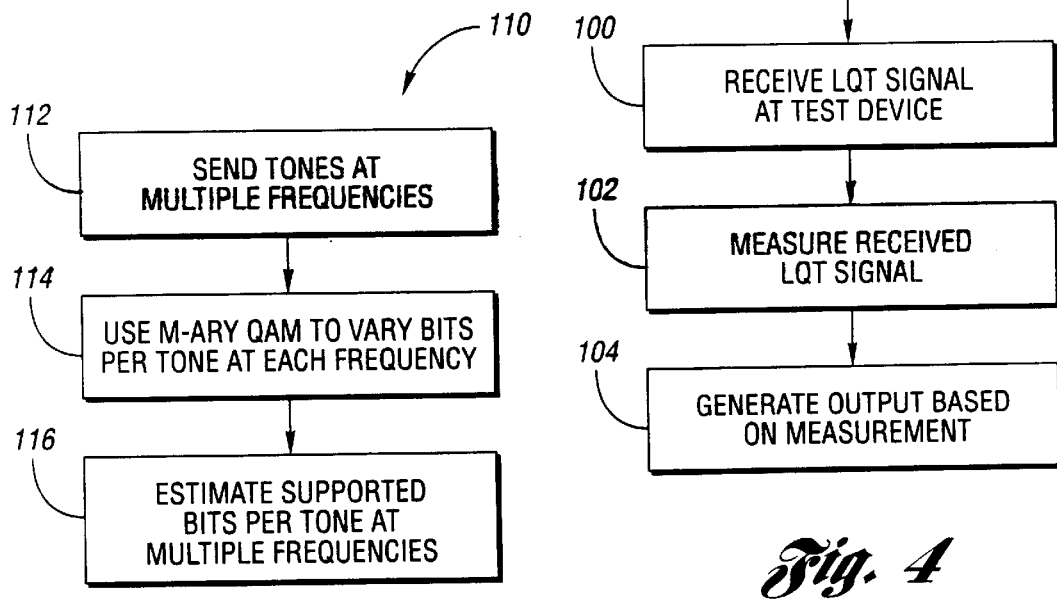
Fig. 4
Fig. 5

METHOD FOR QUALIFYING A LOOP FOR DSL SERVICE

CROSS-REFERENCE TO RELATED APPLICATIONS

This application claims the benefit of U.S. Provisional application Ser. No. 60/114,426, filed on Dec. 31, 1998 and entitled "Loop Qualification Tool."

TECHNICAL FIELD

The present invention relates to a method for qualifying a local loop for digital subscriber line (DSL) service.

BACKGROUND ART xDSL is a generic term for digital subscriber line equipment and services, including packet-based architectures, such as ADSL, HDSL, SDSL, VDSL, and RADSL. That is, x is the generic. xDSL technologies provide extremely high bandwidth over embedded twisted pair, copper cable plant. xDSL technologies offer great potential for bandwidth-intensive applications, such as Internet access, remote LAN access, video conferencing, and video-on-demand.

ADSL or asymmetric digital subscriber line services generally use existing unshielded twisted pair (UTP) copper wires from the telephone company's central office to the subscriber's premise, utilize electronic equipment in the form of ADSL modems at both the central office and the subscriber's premise, send high-speed digital signals up and down those copper wires, and send more information one way than the other. The ADSL flavor of xDSL services is capable of providing a downstream bandwidth of about 1.5 Mbps–6.144 Mbps, and an upstream bandwidth of about 32 Kbps–640 Kbps with loop distances ranging from about 3.7 km–5.5 km. HDSL or high bit rate digital subscriber line services provide a symmetric, high-performance connection over a shorter loop, and typically require two or three copper twisted pairs. HDSL is capable of providing both upstream and downstream bandwidth of about 1.5 Mbps, over loop distances of up to about 3.7 km. SDSL or single line digital subscriber line services provide a symmetric connection that matches HDSL performance using a single twisted pair, but operating over a shorter loop of up to about 3.0 km. VDSL or very high bit rate digital subscriber line services are typically implemented in asymmetric form, as a very high speed variation on the ADSL theme over a very short loop. Specifically, target downstream performance is typically about 52 Mbps over UTP local loops of 300 m, 26 Mbps at 1,000 m, and 13 Mbps at 1,500 m. Upstream data rates in asymmetric implementations tend to range from about 1.6 Mbps to about 2.3 Mbps. Additionally, there is RADSL or rate adaptive digital subscriber line services. RADSL provides a dynamic connection that adapts to the length and quality of the line.

In the xDSL family of services, many xDSL themes, including ADSL, HDSL, SDSL, VDSL, and RADSL, utilize a packet-based approach that does away with the line-grabbing practice of circuit switched networks, such as ISDN (although ISDN service is a form of digital subscriber line). This packet-based approach is very advantageous in a variety of situations, such as high-speed data services, including high definition television or HDTV transmissions.

Of course, xDSL services, also commonly referred to as simply DSL or digital subscriber line services, are much more dependent on line conditions than traditional telephone services. Traditional telephone services typically use a bandwidth including frequencies up to about 3 kilohertz, while the DSL services utilize a bandwidth including frequencies up into the hundreds of kilohertz. While some local loops are in great condition for implementing DSL services, that is, the local loops have short to moderate lengths with minimal bridged taps and splices, many local loops are not as clean. For example, local loop length vary widely, for example, from as short as a few hundred meters to as long as several kilometers.

Further, sometimes the wire gauge for a local loop is not continuous over the length of the loop. That is, a portion of the local loop may be one wire gauge, while an adjacent portion of the local loop has a different wire gauge, with the two portions being spliced together. Still further, many existing local loops have one or more bridged taps. A bridged tap is a length of wire pair that is connected to a loop at one end and is unterminated at the other end. Sometimes, an existing local loop will have several bridged taps so that the telephone company may connect a customer to any one of the taps (while leaving the other taps unterminated). Tapped lines may allow the telephone company to better utilize its copper cable plant distribution. For example, a particular service area may include 25 residences. Because not all residences require multiple phone lines, there may be a total of about 30 or 35 local loops, with some of the loops having multiple bridged taps. As such, it may be possible for any one of the residences to order multiple line service, so long as only a few of the residences do so.

Because DSL services have a strong dependence on line conditions, not all existing loops are qualified for DSL service. Previously, a customer would call his/her service provider and inquire as to whether or not the customer's loop supported DSL service. The customer service representative would perform a database look-up on the customer's line and evaluate their ability to receive service. The customer service representative could also test the circuit using voice band measurement techniques. However, the database records are not always reliable, and results of voice band testing are not always an accurate indicator of DSL qualification because DSL service uses much higher frequencies than voice service. Further, when database look-up and/or voice band measurements are used to determine DSL qualification, sometimes, after the customer has purchased DSL equipment, it is discovered that the line quality is not as good as anticipated in that either DSL support is unavailable, or the customer is left with less than desirable bandwidth capabilities.

For the foregoing reasons, there is need for an improved way for the customer to determine whether or not a local loop is qualified for DSL service.

DISCLOSURE OF INVENTION

It is, therefore, an object of the present invention to provide a method for qualifying a local loop for digital subscriber service that utilizes a test device at the customer end of the loop to measure test signals originating at the provider end of the loop.

In carrying out the above object, a method for qualifying a local loop for digital subscriber line service is provided. The loop has a provider end and a customer end. The method comprises connecting a test device to the customer end of the loop. The device includes processing logic. The method further comprises sending a loop qualification test signal to the device, and measuring the test signal as received at the device with the processing logic. The test signal originates at the provider end of the loop. Further, an output for the loop qualification test is generated based on the measurement.

In one implementation, the method further comprises requesting the sending of the test signal. The test signal is requested by calling a voice response unit (VRU). A test signal generator is connected to the provider end of the loop in response to the request.

In some embodiments, sending the test signal further comprises sending a plurality of tones to the device. In some embodiments, sending the test signal further comprises sending at least one tone using quadrature amplitude modulation (QAM). Further, in some QAM embodiments, sending the at least one tone further comprises sending a first tone using M-ary quadrature amplitude modulation wherein M has a first value, and sending a second tone using M-ary quadrature amplitude modulation wherein M has a second value that is different than the first value.

In some embodiments, measuring the test signal further comprises measuring a signal to noise ratio of the test signal. In some embodiments, measuring the test signal further comprises measuring a power level of the test signal. Further, some embodiments generate the output as a value on a gradient scale, for example, using at least one light emitting diode (LED). Advantageously, some of the test devices made in accordance with the present invention are powered by the loop current. Alternatively, a test device may be battery powered. Still further, some embodiments of the present invention further comprise estimating a number of bits per tone supported over the loop based on measurements of the received test signal.

Further, in carrying out the present invention, a method for qualifying a local loop for digital subscriber line service is provided. The loop has a provider end and a customer end. The method comprises connecting a test device to the customer end of the loop. The device is operative to receive and measure signals. The method further comprises requesting a test of the loop, connecting a test signal generator to the provider end of the loop in response to the request, and sending a loop qualification test signal to the device from the test signal generator. The method further comprises receiving the test signal at the device, measuring the test signal as received at the device, and generating an output for the loop qualification test. The output is based on the measurement.

In some implementations, sending the test signal further comprises sending a plurality of tones having different frequencies. Further, in some embodiments, sending the test signal further comprises sending a first tone modulated to support a first number of bits per tone, and sending a second tone modulated to support a second number of bits per tone. Still further, in some embodiments, sending the test signal further comprises sending a plurality of first tones at a first frequency, and sending a plurality of second tones at a second frequency. The plurality of first tones are modulated to support a plurality of different bit rates. The plurality of second tones are modulated to support a plurality of different bit rates.

Still further, in carrying out the present invention, an apparatus for qualifying a local loop for digital subscriber line service is provided. The loop has a provider end and a customer end. The apparatus comprises a test device having an interface configured to plug into a telephone jack. The test device includes processing logic operative to receive and measure a test signal at a digital subscriber line frequency that is substantially greater than a normal voice telephone frequency. The processing logic is configured to generate an output based on the test signal measurement to indicate a level of digital subscriber line qualification for the loop.

In some embodiments, the precessing logic is configured to receive and measure a plurality of tones having different frequencies. Further, in some embodiments, the processing logic is configured to receive and measure a first tone modulated to support a first number of bits per tone, and a second tone modulated to support a second number of bits per tone.

The advantages associated with embodiments of the present invention are numerous. For example, embodiments of the present invention provide a low cost device that the customer could acquire, or a service provider could give away, that would allow him/her to determine whether the customer's loop qualifies for digital subscriber line service. Further, although some embodiments of the present invention may provide a simple DSL capable/incapable output indicator, other embodiments of the present invention may provide an output that gives some indication of the available bandwidth for DSL services. As such, some embodiments of the present invention provide a test device that allows a customer to determine the potential bandwidth for DSL at the local loop.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a block diagram illustrating a method of the present invention for qualifying a local loop for digital subscriber line service;

FIG. 4 is a block diagram illustrating a method of the present invention in one suitable implementation; and FIG. 5 is a block diagram illustrating an exemplary configuration for sending test tones and multiple frequencies, using M-ary QAM to vary bits per tone at each frequency.

BEST MODE FOR CARRYING OUT THE INVENTION

Figure 1:
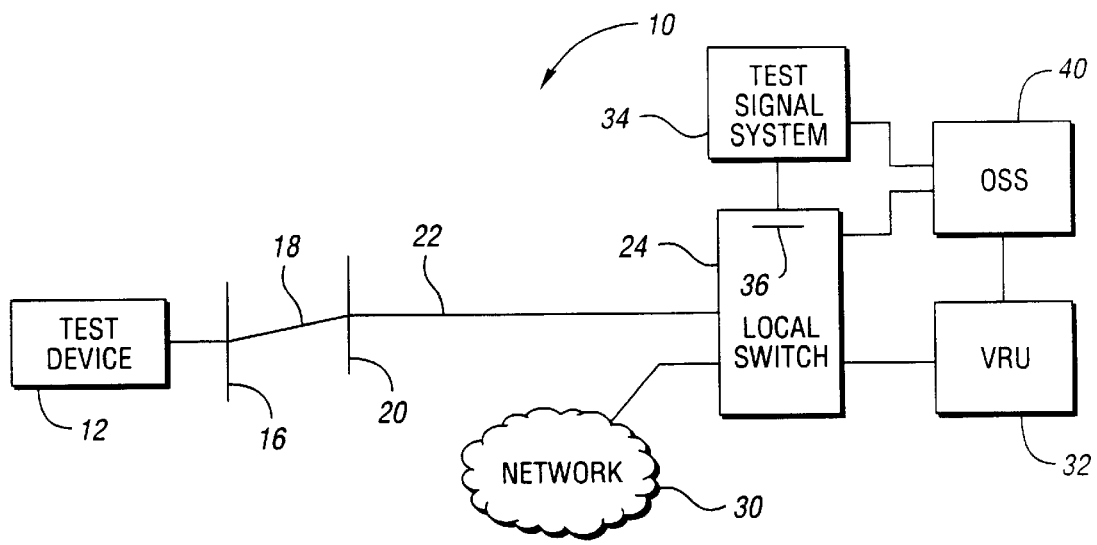
FIG. 1 is a schematic representation of a test device of the present invention connected to a local loop that, in turn, connects to a local switch.

Referring to FIG. 1, a schematic diagram illustrating the use of a test device in accordance with the present invention is generally indicated at 10. A test device 12 connects with a suitable RJ type of connector, as is common at most residences, to a telephone jack 16. Wiring 18 within the home may be configured in any suitable fashion. Of course, it is appreciated that some wiring techniques may provide better DSL results than other techniques. The home wiring (or building wiring) 18, at interface 20, connects to the local loop 22. A common form for local loop 22 is copper twisted pair cable plant. Local loop 22 connects to a local switch 24. Local switch 24 provides access to call network 30, which may be the public switched telephone network (PSTN). A voice response unit 32 is capable of receiving customer calls and initiating a loop quality test through central office operational support system 40. Operational support system 40 connects a test signal system 34, including a test signal generator, to the customer's loop via a test bus 36 at the local switch 24. The local switch 24 may be any suitable class five switch, or any other switch appropriate depending on the network implementation, as is well understood by one of ordinary skill in the art.

Figure 2:
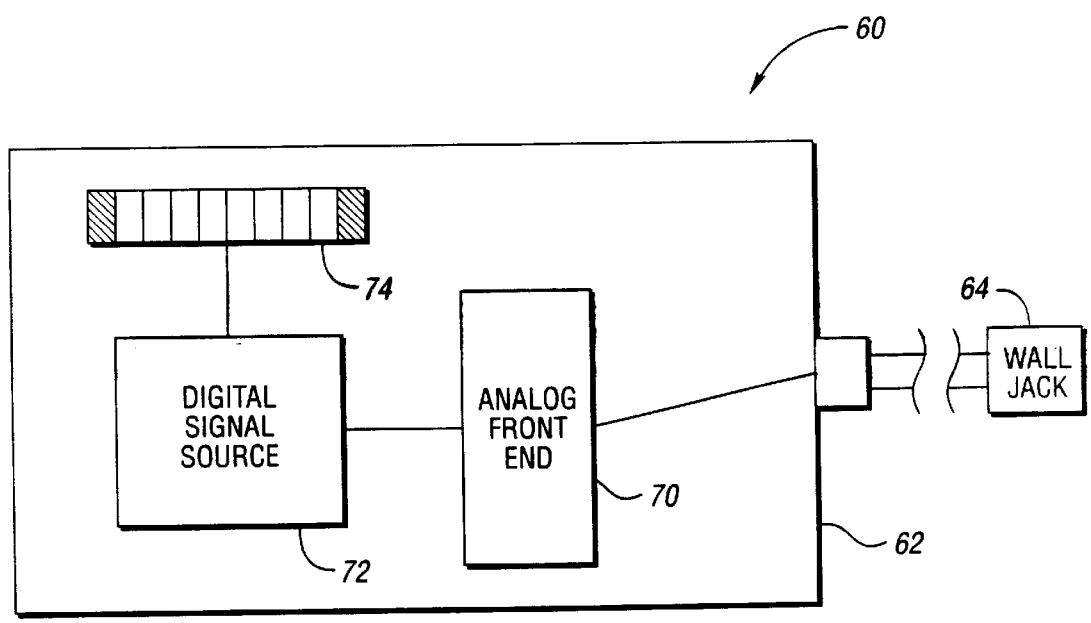
FIG. 2 illustrates a test device of the present invention, showing an analog front end and a digital signal processor connected to an LED output.

The test system generates tones that the test device at the customer site would use to, in preferred embodiments, measure the power level and signal to noise ratio of each tone and make an estimate of the possible bits per tone that could be supported for DSL service. As best shown in FIG. 2, a test device is generally indicated at 60. Test device 60 includes a body 62. The test device, as shown, is connected to a wall jack 64 with, for example, an RJ type cord. The test device includes an analog front end 70 and a digital signal processor 72. The digital signal processor 72 is connected, in the embodiment illustrated, to a gradient light emitting diode (LED) scale 74. Preferably, to keep the cost of the test device down, the system is capable of receiving and measuring signals only. Of course, more advanced testing devices may be provided, depending on the particular cost constraints involved in producing the test devices. The system gradient LED 74 could scale from red to green so that the color of the output display indicates the customers ability to support DSL service, depending on measurements of the test tones. Advantageously, if the electronics are low power, the test device may be powered from the central office battery.

With reference to FIG. 3, a block diagram illustrating a method of the present invention is generally indicated at 80. At block 82, a test device of the present invention is connected to the customer loop end. At block 84, a loop qualification test signal is sent to the test device from the provider loop end. The sending of the test signal may be requested by the customer calling a voice response unit and requesting that the test signal be sent. At block 86, the device measures the loop qualification test signal. That is, in the exemplary implementation (FIG. 2), the analog front end receives the signal, while the digital signal processor measures the signal and generates the output for display 74 (block 88).

In FIG. 4, a block diagram illustrating an exemplary method of the present invention in detail is generally indicated at 90. At block 92, the test device is connected to the customer end of the local loop. At block 94, the customer requests the loop quality test. As mentioned previously, one suitable way to request the test is to call a voice response unit. In another implementation, the test device could be configured to request a test upon being plugged into the wall jack, or with a push button that initiates the request. Further, other variations are possible as is appreciated by one of ordinary skill in the art.

At block 96, the test signal generator is connected to the provider loop end, and at block 98, the loop quality test signal is sent to the device from the provider loop end. At block 100, a loop quality test signal is received at the test device. And, at block 102, the received test signal is measured. At block 104, an output is generated based on the measured signal.

It is to be appreciated that the types of signals used as test signals may take many forms. In one example, the test system would generate six tones as illustrated in the Table below.

| Tone Number | Sinusoidal Frequency |
| --- | --- |
| 6 | 25.875 kHz |
| 16 | 69 kHz |
| 32 | 138 kHz |
| 48 | 207 kHz |

-continued

| Tone Number | Sinusoidal Frequency |
| --- | --- |
| 64 | 276 kHz |
| 128 | 552 kHz |

The tones, in the example, can be generated using the Inverse Discrete Fournier Transform (IDFT) method defined in G.Lite. The signal, in the example, is an unframed signal. The different frequency tones would allow the test device to determine the ability of the line to support various DSL frequencies. In FIG. 5, the sending of tones at multiple frequencies is indicated at block 112, with the exemplary test signal techniques being generally indicated at 110. In one embodiment, the tones are generated concurrently, of course, other embodiments may generate the tones in a different way.

Further, in an exemplary implementation, each tone is sent several times using different modulation each time. The different modulations should support different numbers of bits per tone for the particular frequency being sent. For example, a tone could be first sent with a modulation supporting two bits per tone, and then sent again with a modulation supporting three bits per tone, and so on. In one suitable implementation, each tone to be sent is first sent using two-bit quadrature amplitude modulation (QAM), then sent using three-bit quadrature amplitude modulation (QAM), then sent using four-bit quadrature amplitude modulation (QAM), etc., up to eight-bit quadrature amplitude modulation (QAM). Advantageously, the test device could be configured to determine bits per tone supported at each of several different test frequencies to estimate an overall line quality. As such, in such an implementation, the test would consist of tones at multiple frequencies, using M-ary QAM to vary bits per tone at each frequency (block 114). Thereafter, at block 116, supported bits per tone at multiple frequencies and overall supported bandwidth may be estimated.

For each tone, at each modulation type, a test system in an exemplary implementation would generate a pseudo random sequence. A digital signal processor at the test device could be configured to analyze the test signal and determine based on the receive signal strength, the signal to noise ratio, and the reception of the expected pseudo random sequence, what level of service the customer could receive. The output could be, for example, a gradient LED scale where green indicates that the user could receive the highest level of service (and red indicates the lowest with colors along the gradient indicating medium level of service). Of course, if lower frequency tones such as 69 kHz and 138 kHz do not have adequate signal strength and signal to noise ratio, the red indicator could be illuminated automatically to indicate that no service is capable.

Of course, it is to be appreciated that in accordance with the present invention, a test device is provided for the customer to connect to the customer end of the local loop. A test may be requested, and test signals are then sent from the provider end to the customer end. Embodiments of the present invention use a simple device to determine loop quality based on measured test signals having various frequencies and modulated to support various numbers of bits per tone.

While embodiments of the invention have been illustrated and described, it is not intended that these embodiments illustrate and describe all possible forms of the invention.

What is claimed is:

1. A method for qualifying a local loop for digital subscriber line service, the loop having a provider end and a customer end, the method comprising:

connecting a test device to the customer end of the loop, the device including processing logic;

sending a loop qualification test signal to the device, the test signal originating at the provider end of the loop and including tones at non-voice band frequencies;

measuring the test signal as received at the device with the processing logic; and generating an output for the loop qualification test based on the measurement.

2. The method of claim 1 further comprising:

requesting the sending of the test signal by calling a voice response unit, wherein a test signal generator is connected to the customer end of the loop in response to the request.

3. The method of claim 1 wherein sending the test signal further comprises:

sending a plurality of tones at non-voiceband frequencies and using a plurality of different modulation techniques.

4. The method of claim 1 wherein sending the test signal further comprises:

sending at least one tone using quadrature amplitude modulation.

5. The method of claim 4 wherein sending the at least one tone further comprises:

sending a first tone using M-ary quadrature amplitude modulation wherein M has a first value; and sending a second tone using M-ary quadrature amplitude modulation wherein M has a second value that is different than the first value.

6. The method of claim 1 wherein measuring the test signal further comprises:

measuring a signal to noise ratio of the test signal.

7. The method of claim 1 wherein measuring the test signal further comprises:

measuring a power level of the test signal.

8. The method of claim 1 wherein generating the output further comprises:

generating the output as a value on a gradient scale.

9. The method of claim 1 further comprising:

generating the output with at least one light emitting diode (LED).

10. The method of claim 1 wherein the test device is powered by the loop.

11. The method of claim 1 wherein the test signal includes a tone and wherein the method further comprises:

estimating a number of bits per tone supported over the loop based on the measurement.

12. A method for qualifying a local loop for digital subscriber line service, the loop having a provider end and a customer end, the method comprising:

connecting a test device to the customer end of the loop, the device being operative to receive and measure test signals;

requesting a test of the loop;

connecting a test signal generator to the provider end of the loop, in response to the request;

sending a loop qualification test signal to the device from the test signal generator, the signal including tones at non-voiceband frequencies;

receiving the test signal at the device;

measuring the test signal as received at the device; and generating an output for the loop qualification test based on the measurement.

13. The method of claim 12 wherein sending the test signal further comprises:

sending a plurality of tones having different frequencies.

14. The method of claim 12 wherein sending the test signal further comprises:

sending a first tone modulated to support a first number of bits per tone; and sending a second tone modulated to support a second number of bits per tone.

15. The method of claim 12 wherein sending the test signal further comprises:

sending a plurality of first tones at a first frequency, the plurality of first tones being modulated to support a plurality of different bit rates; and sending a plurality of second tones at a second frequency, the plurality of second tones being modulated to support a plurality of different bit rates.

16. An apparatus for qualifying a local loop for digital subscriber line service, the loop having a provider end and a customer end, the apparatus comprising:

a test device having an interface configured to plug in to a telephone jack, the test device including processing logic operative to receive and measure a test signal at a digital subscriber line frequency that is substantially greater than a normal voice telephone frequency, and wherein the processing logic is configured to generate an output based on the test signal measurement to indicate a level of digital subscriber line qualification for the loop.

17. The apparatus of claim 16 wherein the processing logic is configured to receive and measure a plurality of tones having different frequencies.

18. The apparatus of claim 16 wherein the processing logic is configured to receive and measure a first tone modulated to support a first number of bits per tone, and a second tone modulated to support a second number of bits per tone.

19. The apparatus of claim 16 wherein the processing logic is configured to receive and measure a plurality of first tones at a first frequency, the plurality of first tones being modulated to support a plurality of different bit rates, and to receive and measure a plurality of second tones at a second frequency, the plurality of second tones being modulated to support a plurality of different bit rates.

* * * * *